(12) United States Patent
Lazarev et al.

(10) Patent No.: US 11,687,246 B2
(45) Date of Patent: Jun. 27, 2023

(54) ELASTIC BUFFER BASED ASYMMETRIC PIPELINE FIFO PROCESS

(71) Applicant: Western Digital Technologies, Inc., San Jose, CA (US)

(72) Inventors: Yevgeny Lazarev, Beer Sheva (IL); Elkana Richter, Tene (IL); Shay Benisty, Beer Sheva (IL)

(73) Assignee: Western Digital Technologies, Inc., San Jose, CA (US)

( * ) Notice: Subject to any disclaimer, the term of this patent is extended or adjusted under 35 U.S.C. 154(b) by 97 days.

(21) Appl. No.: 17/182,038

(22) Filed: Feb. 22, 2021

(65) Prior Publication Data

US 2022/0100388 A1    Mar. 31, 2022

Related U.S. Application Data

(60) Provisional application No. 63/085,035, filed on Sep. 29, 2020.

(51) Int. Cl.
*G06F 3/06* (2006.01)
*G06F 1/08* (2006.01)

(52) U.S. Cl.
CPC .............. *G06F 3/0613* (2013.01); *G06F 1/08* (2013.01); *G06F 3/0656* (2013.01); *G06F 3/0659* (2013.01); *G06F 3/0673* (2013.01)

(58) Field of Classification Search
CPC ........ G06F 3/0613; G06F 3/0659; G06F 1/08; G06F 3/0656; G06F 3/0673; G06F 3/061; G06F 3/068; G06F 5/06; G06F 13/1673
See application file for complete search history.

(56) References Cited

U.S. PATENT DOCUMENTS

| | | | |
|---|---|---|---|
| 6,553,448 B1 | 4/2003 | Mannion | |
| 6,801,143 B2 | 10/2004 | Oberai et al. | |
| 11,010,293 B1 * | 5/2021 | Kovishaner | G06F 12/0862 |
| 2002/0156966 A1 * | 10/2002 | Ward | G06F 15/167 |
| | | | 711/131 |

(Continued)

FOREIGN PATENT DOCUMENTS

CN    102708086 A    10/2012

OTHER PUBLICATIONS

Peter Alfke et al.; "Simulation and Synthesis Techniques for Asynchronous FIFO Design with Asynchronous Pointer Comparisons" Sunburst Design, Synopsys Users Group Conference, SNUG, San Jose, CA; Users Papers, 2002 (18 papers).

(Continued)

*Primary Examiner* — Jae U Yu
(74) *Attorney, Agent, or Firm* — Patterson + Sheridan, LLP; Steven H. VerSteeg (57) ABSTRACT

The present disclosure generally relates to efficient management of an elastic buffer. Efficient management can be achieved by using an asymmetric asynchronous First In, First Out (FIFO) approach based on normalization of write and read pointers. The normalization is done in accordance with the FIFO depth while keeping a single bit change approach. In order to achieve an asymmetric dynamic ability for part per million (PPM) compensation, a plurality of sub-FIFOs are used for opponent side pointer synchronization. Combining the features allows for creating an asynchronous asymmetric FIFO with pipeline characteristics.

14 Claims, 7 Drawing Sheets

(56) References Cited

U.S. PATENT DOCUMENTS

| | | | |
|---|---|---|---|
| 2003/0110364 A1* | 6/2003 | Tang | G06F 7/14 |
| | | | 711/168 |
| 2003/0182503 A1* | 9/2003 | Leong | G06F 3/0601 |
| | | | 710/36 |
| 2009/0086874 A1 | 4/2009 | Wang et al. | |
| 2009/0265527 A1* | 10/2009 | Luick | G06F 9/3828 |
| | | | 712/216 |

OTHER PUBLICATIONS

Das, Shonit; "Comparison of Synchronization Techniques in Pointer FIFOs", https://my.ece.utah.edu/~kstevens/6770/reports/09-fifo-synchronization.pdf (4 pages).

* cited by examiner

NoE - Number of Elements

Push 202, NoE = 6: Data 1, Data 2, Data 3, Data 4, SKP, SKP, X, X
Push 204, NoE = 4: Data 5, Data 6, Data 7, Data 8, X, X, X, X
Push 206, NoE = 5: Data 9, Data 10, Data 11, Data 12, SKP, X, X, X
Push 208, NoE = 1: Data 13, X, X, X, X, X, X, X Syncronization Pop 210, NoE = 4: Data 1, Data 2, Data 3, Data 4, X, X, X, X
Pop 212, NoE = 4: SKP, SKP, Data 5, Data 6, X, X, X, X
Pop 214, NoE = 2: Data 7, Data 8, X, X, X, X, X, X
Pop 216, NoE = 6: Data 9, Data 10, Data 11, Data 12, SKP, Data 13, X, X

ELASTIC BUFFER BASED ASYMMETRIC PIPELINE FIFO PROCESS

CROSS-REFERENCE TO RELATED APPLICATIONS

This application claims benefit of U.S. provisional patent application Ser. No. 63/085,035, filed Sep. 29, 2020, which is herein incorporated by reference.

BACKGROUND OF THE DISCLOSURE

Field of the Disclosure

Embodiments of the present disclosure generally relate to effective elastic buffer management.

Description of the Related Art

High speed interfaces are commonly used today in any solid state device (SSD) product with typical protocols being SATA, PCIe, and SAS to name a few. Every high speed protocol has data transferred in the form of serial differential signals. A clock data recovery (CDR) circuit is responsible for deriving serial data and clock from the data stream. Both sending and receiving endpoints use independent reference clock sources. A frequency difference can arise due to discrepancies between restored frequencies and local frequencies. In order to ensure received data correctness and timing synchronization between recovered and local clocks, an elastic buffer is used for clock difference compensation between the sending and receiving point. The elastic buffer is used to absorb delays as well as delay variations generated by transmission over physical media software elaboration or other types in a manner that is acceptable by protocol specifications.

Figure 1:
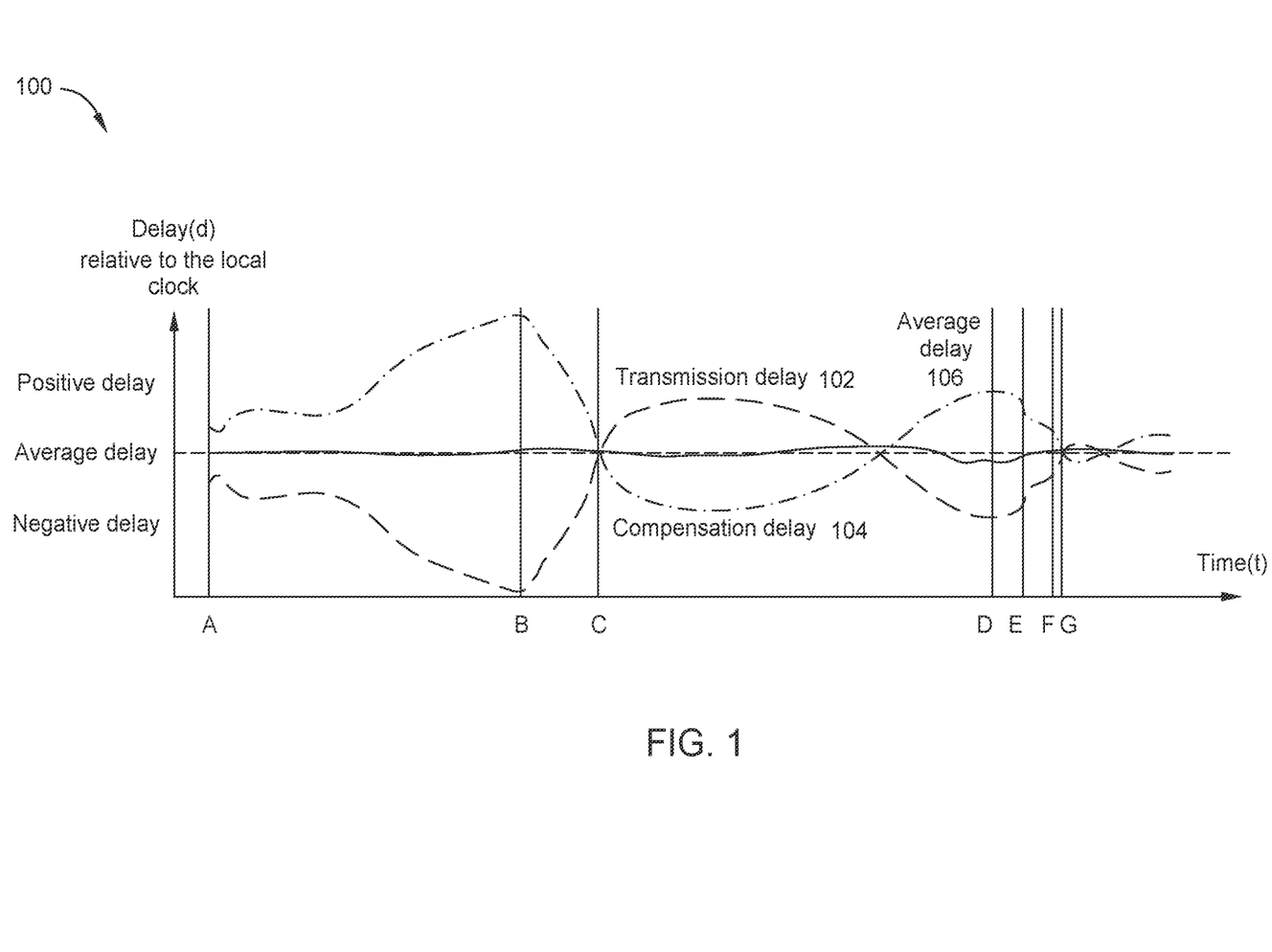
FIG. 1 is a schematic illustration of the operating principle of an elastic buffer operating in half-full mode, according to disclosed embodiments.

There are two primary elastic buffer working modes: nominal empty and half full. Nominal empty removes all available specific predefined (SKP) symbols and constantly strives to be empty. Half full aims to work in the middle of the dynamic memory range to ensure the absorption of positive or negative deviation without hurting the continuity of the data stream as shown in FIG. 1.

In PCIe, the clock compensation goal is achieved by adding or removing SKP symbols, which are part of an SKP ordered set where each set includes one to five SKP symbols. Depending upon the filling of the memory, elastic buffer logic removes or adds SKP symbols in order to be as close to the average value as possible.

As noted above, the recovered clock by the CDR and the local clock are asynchronous. To ensure the quality of received data stream, a synchronization method is used between the independent clock domains. Customarily, an asynchronous First In, First Out (FIFO) approach with gray conversion schema is used for single bit toggling in order to reduce mean time to bit failure (MTBF) impact.

Proper use of gray encoding requires two factors. The first factor is that memory depth must be aligned to the power of two (i.e., 2, 4, 8, 16, 32, etc.), which is negligible for low-depth FIFOs but in the case of a FIFO with a large depth can have a significant hardware (HW) consumption impact. For example, a FIFO with a depth of 129 entries must be enlarged to 256 entries. The second factor is that each write operation (oftentimes called a "push" operation) allows only a single entry. A dynamic value number of entries at a single "push" is not allowed.

The elastic buffer must be able to absorb parts per million (PPM) changes resulted by a spread spectrum clocking (SSC) mechanism. In other words, a dynamic range of the elastic buffer memory must be wide enough for effective compensation and demands a memory and rounding to a power of two that will, in most cases, make the situation worse from a HW consumption perspective.

Figure 2:
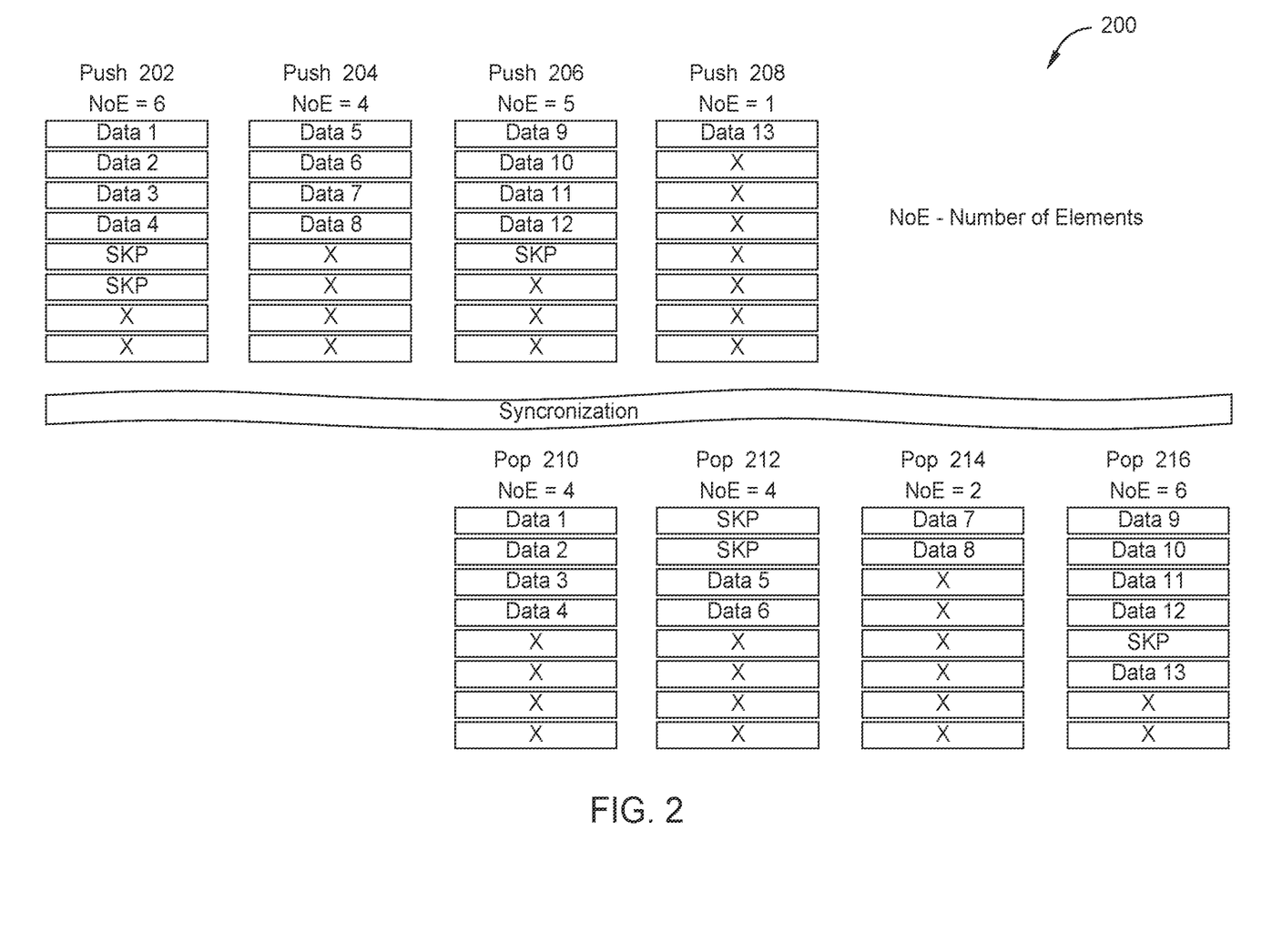
FIG. 2 is a schematic illustration of asymmetric entries for write pointers and read pointers in an elastic buffer, according to disclosed embodiments.

Due to symbol based data resolution, the elastic buffer must efficiently and reliably add and drop SKP symbols as shown in FIG. 2. Due to gray code limitations, a dynamic increase of write and read pointers is not permitted, which requires the use of hand-shake FIFOs or FIFO chaining that results in the addition of HW resources and data path latency enlargement.

Thus, there is a need in the art for a more efficient approach for elastic buffer memory management.

SUMMARY OF THE DISCLOSURE

The present disclosure generally relates to efficient management of an elastic buffer. Efficient management can be achieved by using an asymmetric asynchronous First In, First Out (FIFO) approach based on normalization of write and read pointers. The normalization is done in accordance with the FIFO depth while keeping a single bit change approach. In order to achieve an asymmetric dynamic ability for part per million (PPM) compensation, a plurality of sub-FIFOs are used for opponent side pointer synchronization. Combining the features allows for creating an asynchronous asymmetric FIFO with pipeline characteristics.

In one embodiment, a data storage device comprises: one or more memory devices; and a controller coupled to the one or more memory devices, wherein the controller is configured to deliver data to a host device according to an asynchronous asymmetric First In, First Out (FIFO) process.

In another embodiment, a data storage device comprises: one or more memory devices; and a controller coupled to the one or more memory devices, wherein the controller comprises: a main First In, First Out (FIFO) chip; a write FIFO chip coupled to the main FIFO chip; a read FIFO chip coupled to the main FIFO chip; a write sub-FIFO chip array, wherein the write sub-FIFO chip array is coupled to the write FIFO chip and the read FIFO chip; and a read sub-FIFO chip array, wherein the read sub-FIFO chip array is coupled to the write FIFO chip and the read FIFO chip.

In another embodiment, a data storage device comprises: means to store data; and a controller coupled to the means to store data, wherein the controller is configured to: calculate a minimum index value; calculate a maximum index value; and synchronize indexes of read pointers and write pointers based upon the calculated minimum index value and the maximum index value.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to efficient management of an elastic buffer. Efficient management can be achieved by using an asymmetric asynchronous First In, First Out (FIFO) approach based on normalization of write and read pointers. The normalization is done in accordance with the FIFO depth while keeping a single bit change approach. In order to achieve an asymmetric dynamic ability for part per million (PPM) compensation, a plurality of sub-FIFOs are used for opponent side pointer synchronization. Combining the features allows for creating an asynchronous asymmetric FIFO with pipeline characteristics.

FIG. 1 is a schematic illustration of the operating principle of an elastic buffer operating in half-full mode, according to disclosed embodiments. The elastic buffer operating in half-full mode aims to work in the middle of the dynamic memory range in order to ensure that the absorption of any positive or negative deviations does not hinder the continuity of the data stream. In other words, the elastic buffer operating in half-full mode attempts to maintain any generated delays, such as those generated by transmission over physical media, software elaboration, or the like, between a positive delay range and a negative delay range. It is to be understood that other elastic buffer working modes, such as nominal empty, are contemplated and may be applicable to the described embodiments herein.

In FIG. 1, the delays are illustrated relative to a local clock of a data storage device. For example, a controller and/or processor of the data storage device may include the local clock to manage the ingress and egress of data and commands to other components of the data storage device and external devices coupled to the data storage device. When sending a command from a source to a receiver, a delay may exists between the time that the command is sent from the source and the time that the command is received by the receiver. In some cases, the delay may be negligible. However, in other cases, the delay may be large enough to cause non-optimal effects, such as causing a bottleneck.

The delay between a positive delay range and a negative delay range is considered the average delay and is illustrated by the dashed line. The generated delays is illustrated by the transmission delay curve 102. In order to achieve a delay around the average delay dashed line, a compensation delay, illustrated by the compensation delay curve 104, is added or removed in response to the generated delays. The resulting curve is the average delay curve 106. The average delay curve 106 (i.e., the clock compensation goal) may be achieved by adding or removing specific predefined (SKP) symbols, which is part of a SKP ordered set. In some embodiments, each set of the SKP ordered set includes between about one to about five SKP symbols.

For example, at time "A", the transmission delay curve 102 has a negative delay. In order to compensate for the negative delay and return the average delay curve 106 to the average delay dashed line, SKP symbols may be added to a recovered clock (i.e., the clock associated with the compensation delay curve 104), hence, the positive delay of the compensation delay curve 104. At time "B", the transmission delay curve 102 become more positive and the SKP symbols may be removed, such that the change of the compensation delay curve 104 matches the change of the transmission delay curve 102.

Similarly, at time "C", the transmission delay curve 102 has a positive delay, such that the compensation delay should be a negative delay to maintain the average delay. As such, SKP symbols are removed from the recovered clock to generate a negative compensation delay, as illustrated by the compensation delay curve 104. At time "D", the average delay curve 106 deviates slightly from the average delay dashed line. However, because of the addition and removal of the SKP symbols from the recovered clock, the magnitude of the deviation is minimized. Times "E", "F", and "G" illustrate a more robust adding and removing of SKP symbols from the recovered clock, as illustrated by the compensation delay curve 104, in response to changes to the transmission delay, as illustrated by the transmission delay curve 102.

FIG. 2 is a schematic illustration of asymmetric entries for write pointers and read pointers in an elastic buffer, according to disclosed embodiments. The elastic buffer, such as the elastic buffer operating in half-full mode of FIG. 1, may be required to be able to absorb parts per million (PPM) changes due to a spread spectrum clocking (SSC) mechanism. The SSC mechanism is utilized to reduce radiated emissions of digital clock signals by varying the frequency of a clock signal in a controlled manner. In other words, the dynamic range of the elastic buffer memory may be required to be large enough to account for the dynamic variation of the SSC mechanism.

In order to reduce mean time between failure (MTBF) impacts, an asynchronous First In, First Out (FIFO) approach coupled with a gray encoding conversion schema may be utilized. In a FIFO approach, the first element that is received, such as a first data, is the first element that is sent. Likewise, the second element that is received is the second element that is sent. However, the asynchronous FIFO approach with a gray encoding conversion schema may only receive a single change of data, such as an increase or decrease of a single SKP symbol or data. Receiving more than a single change of data, such as multiple SKP symbols, may cause the gray encoding conversion schema to have reduced performance.

In FIG. 2, an asymmetric entries for write pointers and read pointers in an elastic buffer is illustrated. The write pointers are indicated by a plurality of push operations 202, 204, 206, 208 and the read pointers are indicated by a plurality of pop operations 210, 212, 214, 216. Each of the plurality of push operations 202, 204, 206, 208 and each of the plurality of pop operations 210, 212, 214, 216 have eight possible entries that may be filled by either data or SKP symbols. The listed number of possible entries is not intended to be limiting, but to provide an example of a possible embodiment. The maximum number of possible entries is defined by the memory depth, where the memory depth is aligned to a "power-of-two". For example, the maximum number of possible entries may be any number that satisfies the equation: maximum number of possible entries=$2^x$, where "x" refers to any appropriate integer value. For example, in the embodiment illustrated in FIG. 2, when x=3, the maximum number of possible entries is equal to 8 because $2^3$=8 or 2*2*2=8, where the number of entries is equal to or less than 8.

A first push operation 202 includes 6 number of elements (NoE), where 4 of the 6 NoE are associated with data (1-4) and the remaining 2 of the 6 NoE are associated with SKP symbols. A second push operation 204 includes 4 NoE, where all 4 of the NoE are associated with data (5-8). A third push operation 206 includes 5 NoE, where 4 of the 5 NoE are associated with data (9-12) and the remaining 1 of the 5 NoE is associated with a SKP symbol. A fourth push operation 208 includes 1 NoE, where the 1 NoE is associated with data (13).

During the third push operation 206, a first pop operation 210 occurs, where the first pop operation 210 includes 4 NoE. The 4 NoE of the first pop operation 210 are associated with data (1-4). Similarly, during the fourth push operation 208, a second pop operation 212 occurs, where the second pop operation 212 includes 4 NoE. 2 of the 4 NoE of the second pop operation 212 are associated with SKP symbols and the remaining 2 of the 4 NoE of the second pop operation are associated with data (5-6). A third pop operation 214 includes 2 NoE, where the 2 NoE are associated with data (7-8). A fourth pop operation 216 includes 6 NoE, where 5 of the 6 NoE are associated with data (9-13) and the remaining 1 of the 6 NoE is associated with a SKP symbol. Because the NoE may increase by more than 1 when going from a push operation to a push operation, such as between the first push operation 202 and the second operation 204, or from a pop operation to a pop operation, such as between the third pop operation 214 and the fourth pop operation 216, the gray encoding schema may be inefficient in handling the dynamic increase of read pointers and/or write pointers from push operation to push operation or from pop operation to pop operation.

Figure 3:
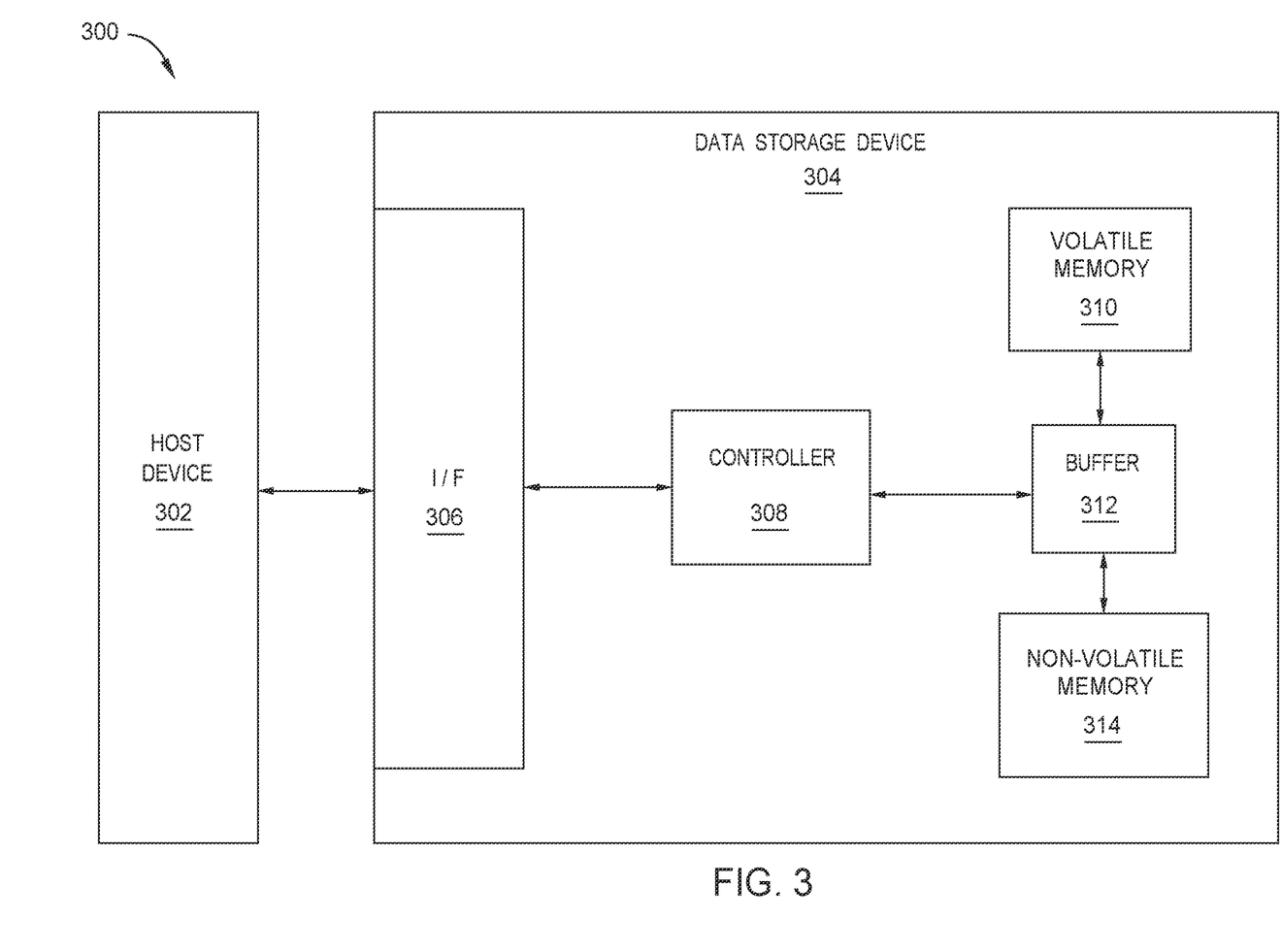
FIG. 3 is a schematic illustration of a storage system, according to disclosed embodiments.

FIG. 3 is a schematic block diagram illustrating a storage system 300 in which data storage device 304 may function as a storage device for a host device 302, according to disclosed embodiments. For instance, the host device 302 may utilize a non-volatile memory (NVM) 314 included in data storage device 304 to store and retrieve data. The host device 302 may include a host DRAM to temporarily store data to be sent to the data storage device 304. In some examples, the storage system 300 may include a plurality of storage devices, such as the data storage device 304, which may operate as a storage array. For instance, the storage system 300 may include a plurality of data storage devices 304 configured as a redundant array of inexpensive/independent disks (RAID) that collectively function as a mass storage device for the host device 302.

The host device 302 may store and/or retrieve data to and/or from one or more storage devices, such as the data storage device 304. As illustrated in FIG. 3, the host device 302 may communicate with the data storage device 304 via an interface (I/F) 306. The host device 302 may comprise any of a wide range of devices, including computer servers, network attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The data storage device 304 includes a controller 308, NVM 314, volatile memory 310, an interface 306, and a buffer 312. In some examples, the data storage device 304 may include additional components not shown in FIG. 3 for the sake of clarity. For example, the data storage device 304 may include a printed circuit board (PCB) to which components of the data storage device 304 are mechanically attached and which includes electrically conductive traces that electrically interconnect components of the data storage device 304, or the like. In some examples, the physical dimensions and connector configurations of the data storage device 304 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 304 may be directly coupled (e.g., directly soldered) to a motherboard of the host device 302.

The interface 306 of the data storage device 304 may include one or both of a data bus for exchanging data with the host device 302 and a control bus for exchanging commands with the host device 302. The interface 306 may operate in accordance with any suitable protocol. For example, the interface 306 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. The electrical connection of the interface 306 (e.g., the data bus, the control bus, or both) is electrically connected to the controller 308, providing electrical connection between the host device 302 and the controller 308, allowing data to be exchanged between the host device 302 and the controller 308. In some examples, the electrical connection of the interface 306 may also permit the data storage device 304 to receive power from the host device 302.

The NVM 314 may include a plurality of memory devices or memory units. NVM 314 may be configured to store and/or retrieve data. For instance, a memory unit of NVM 314 may receive data and a message from the controller 308 that instructs the memory unit to store the data. Similarly, the memory unit of NVM 314 may receive a message from the controller 308 that instructs the memory unit to retrieve data. In some examples, each of the memory units may be referred to as a die. In some examples, a single physical chip may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit of NVM 314 may include any type of non-volatile memory devices, such as flash memory devices, phase-change memory (PCM) devices, resistive random-access memory (ReRAM) devices, magnetoresistive random-access memory (MRAM) devices, ferroelectric random-access memory (F-RAM), holographic memory devices, and any other type of non-volatile memory devices.

The NVM 314 may comprise a plurality of flash memory devices or memory units. NVM Flash memory devices may include NAND or NOR based flash memory devices and may store data based on a charge contained in a floating gate of a transistor for each flash memory cell. In NVM flash memory devices, the flash memory device may be divided into a plurality of dies, where each die of the plurality of dies includes a plurality of blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The data storage device 304 also includes volatile memory 310, which may be used by controller 308 to store information. Volatile memory 310 may include one or more volatile memory devices. In some examples, the controller 308 may use volatile memory 310 as a cache. For instance, the controller 308 may store cached information in volatile memory 310 until cached information is written to non-volatile memory 314. Examples of volatile memory 310 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

The data storage device 304 includes a controller 308, which may manage one or more operations of the data storage device 304. For instance, the controller 308 may manage the reading of data from and/or the writing of data to the NVM 314. In some embodiments, when the data storage device 304 receives a write command from the host device 302, the controller 308 may initiate a data storage command to store data to the NVM 314 and monitor the progress of the data storage command. The controller 308 may determine at least one operational characteristic of the storage system 300 and store the at least one operational characteristic to the NVM 314. In some embodiments, when the data storage device 304 receives a write command from the host device 302, the controller 308 temporarily stores the data associated with the write command in the internal memory or buffer 312 before sending the data to the NVM 314. In other embodiments, the controller 308 may be configured to deliver data to the host device 302 according to an asynchronous asymmetric FIFO process.

Figure 4:
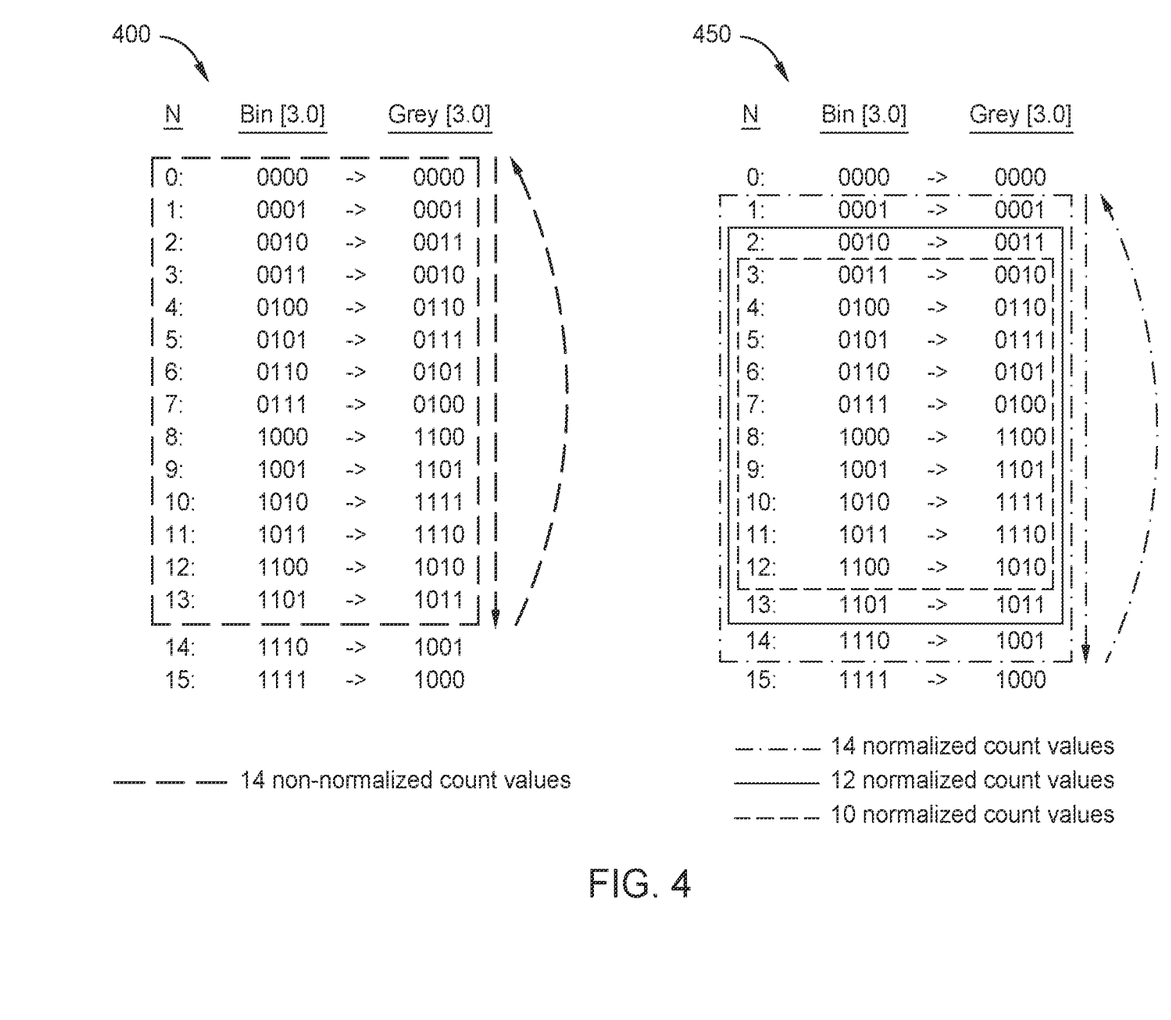
FIG. 4 illustrates a comparison between non-normalized gray encoded values and normalized gray encoded values, according to disclosed embodiments.

FIG. 4 illustrates a comparison between non-normalized gray encoded values 400 and normalized gray encoded values 450, according to disclosed embodiments. A non-normalized gray encoded value is a "power-of-two" number, such as the "power-of-two" number described in FIG. 2. For low-depth FIFO depths, rounding to the nearest "power-of-two" value may be negligible. For example, when the required depth is 7, then the nearest "power-of-two" value is 8, where rounding the required depth to the next nearest "power-of-two" value increases the required depth by a minimal value or in this example, by 1. However, for high-depth FIFO depths, rounding to the nearest "power-of-two" value may result in a large hardware utilization impact. For example, when the required depth is 224, then the nearest "power-of-two" value is 256 (224 is 7/8ths of 256). The increase in the required depth is 32.

In the gray encoding schema, each time the NoE is incremented, a single bit may change. For example, in the non-normalized gray encoded values 400, when incrementing from N=0 to N=1, the gray encoded value changes from 0000 to 0001 indicating a single bit change. When the index counter is 14 (N=0), reading a fifteenth value returns the index counter from N=13 to N=0 because the rounded required depth is rounded to the next nearest power of 2, which is 16. When N=13, the gray encoded value is 1011. When returning to N=0, the gray encoded value is 0000. Thus, the gray encoding schema may have reduced reliability or reduced performance as the gray encoding schema may not be able to handle more than a single bit change.

However, by normalizing the FIFO depth for both read pointers and write pointers, an asynchronous asymmetric FIFO with pipeline characteristics may be generated by a controller of a data storage device. The controller, such as the controller 308 of FIG. 3, may deliver data to a host device, such as the host device 302 of FIG. 3, according to the asynchronous asymmetric FIFO with pipeline characteristics process that satisfies the gray encoding schema requirement of only changing a single bit for each increment. The asynchronous asymmetric FIFO process includes a minimum index value and a maximum index value. The minimum index value and the maximum index value are a lower and an upper bound that may encompass the middle range of the "power-of-two" depth.

In one example, the minimum index value is calculated according to the following formula: ((required depth rounded to the power of 2)/2)−(required depth/2), where the required depth is two times the number of index entries in order to account for both a full status and an empty status and the rounded to the power of 2 is an even number of a geometric sequence starting at 2 with a common ratio of 2. For example, when the required depth is 7, then the two times the required depth rounded to the power of 2 is 16. Plugging the values into the formula results in (16/2)−(14/2) or a minimum index value of 1.

The maximum index value is calculated according to the following formula: ((required depth rounded to the power of 2)/2)+(required depth/2)−1, where the required depth is two times the number of index entries in order to account for both a full status and an empty status and the rounded to the power of 2 is an even number of a geometric sequence starting at 2 with a common ratio of 2. For example, when the required depth is 7, then the two times the required depth rounded to the power of 2 is 16. Plugging the values into the formula results in (16/2)+(14/2)−1 or a maximum index value of 14.

As illustrated by the normalized gray encoded values 450, when N=14 (the maximum index value), the gray encoded value is 1001. When increasing the depth by 1, the N-value equals 1 (the minimum index value) and the resulting gray encoded value is 0001, which satisfies the maximum of a single bit change requirement.

In another example, when the required depth is 6, then the minimum index value is 2 and the maximum index value is 13, indicating an upper and lower bound of the "power-of-two" depth. As illustrated by the normalized gray encoded values 450, when N=13 (the maximum index value), the gray encoded value is 1011. When increasing the depth by 1, the N-value equals 2 (the minimum index value) and the resulting gray encoded value is 0011, which satisfies the maximum of a single bit change requirement.

In yet another example, when the required depth is 5, then the minimum index value is 3 and the maximum index value is 12, indicating an upper and lower bound of the "power-of-two" depth. As illustrated by the normalized gray encoded values 450, when N=12 (the maximum index value), the gray encoded value is 1010. When increasing the depth by 1, the N-value equals 3 (the minimum index value) and the resulting gray encoded value is 0010, which satisfies the maximum of a single bit change requirement.

Figure 5:
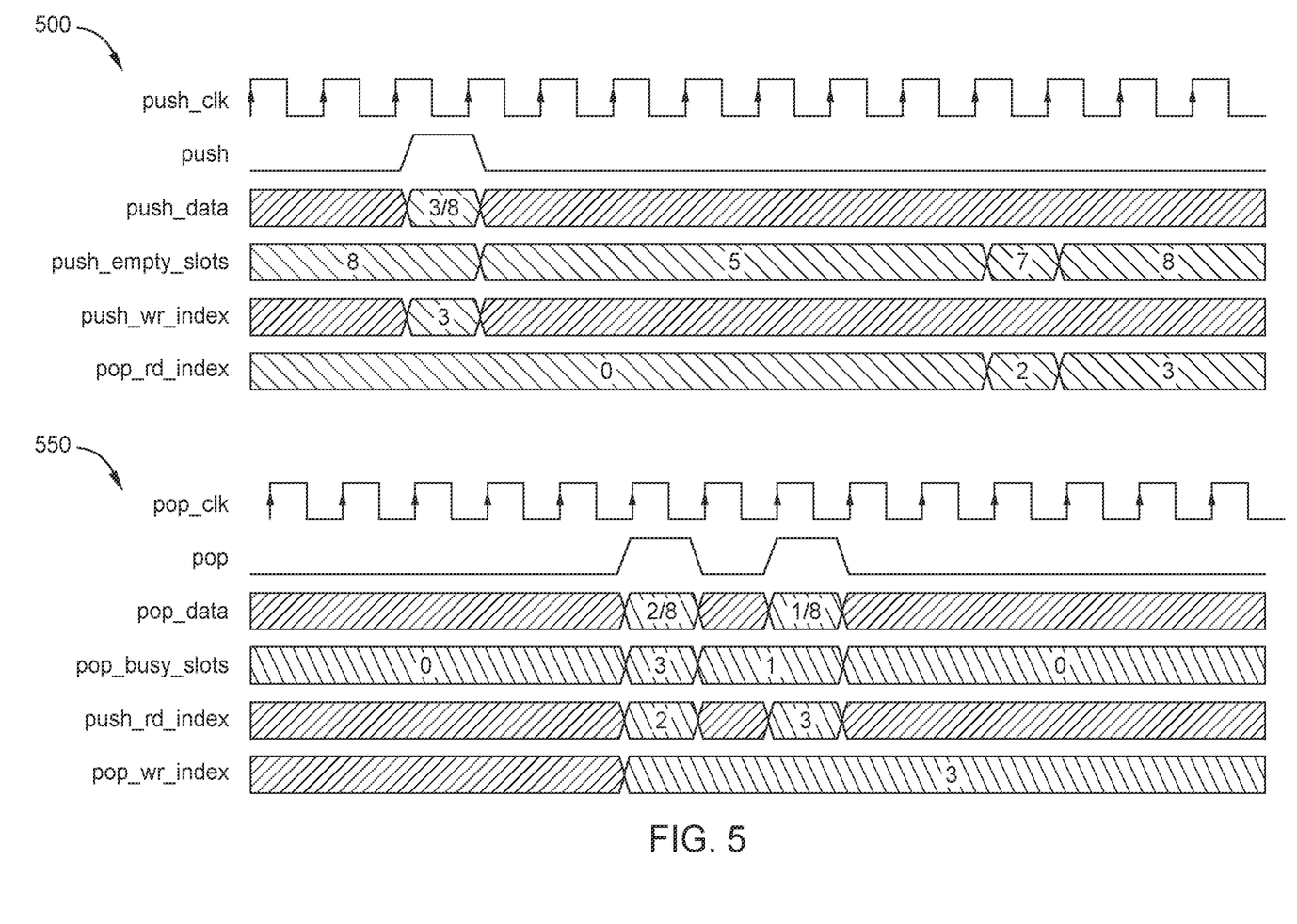
FIG. 5 illustrates an example of multiple entries of a push operation and a pop operation, according to disclosed embodiments.

FIG. 5 illustrates an example of multiple entries of a push operation 500 and a pop operation 550, according to disclosed embodiments. In order to ensure the reliability and quality of data during Cross Domain Crossing (CDC), the indexes of the read pointers should be synchronized with the write pointers of the opponent side for empty or full statuses detection. Furthermore, the CDC may be able to handle a dynamic number of entries during a push or pop operation. The push operation clock cycle and the pop operation clock cycle may be offset, in some embodiments.

For example, at a first clock cycle of the push operation 500, 3 out of 8 available entries is pushed. Because the 3 entries are pushed, then the number of push slots decreases from 8 to 5 and the push write index increases to 3. After completing a push operation, as shown when the push empty slots increases from 5 to 7, the pop read index increases from 0 to 2.

Likewise, during the pop operation 550, 2 out of 8 entries are popped at a second clock cycle, where the second clock cycle is different from the first clock cycle, and 1 out 8 entries are popped at a third clock cycle, where the third clock cycle occurs after the second cycle. Because the push operation 500 includes 3 push entries, the pop busy slots is 3. However, the push read index is 2, when the 2 out of 8 entries are popped. After completing 2 of the 8 pop entries, the pop busy slots reduces to 1 due to the 1 remaining pop entry to be completed. When the 1 remaining pop entry is completed, the push read index increases to 3.

Figure 6:
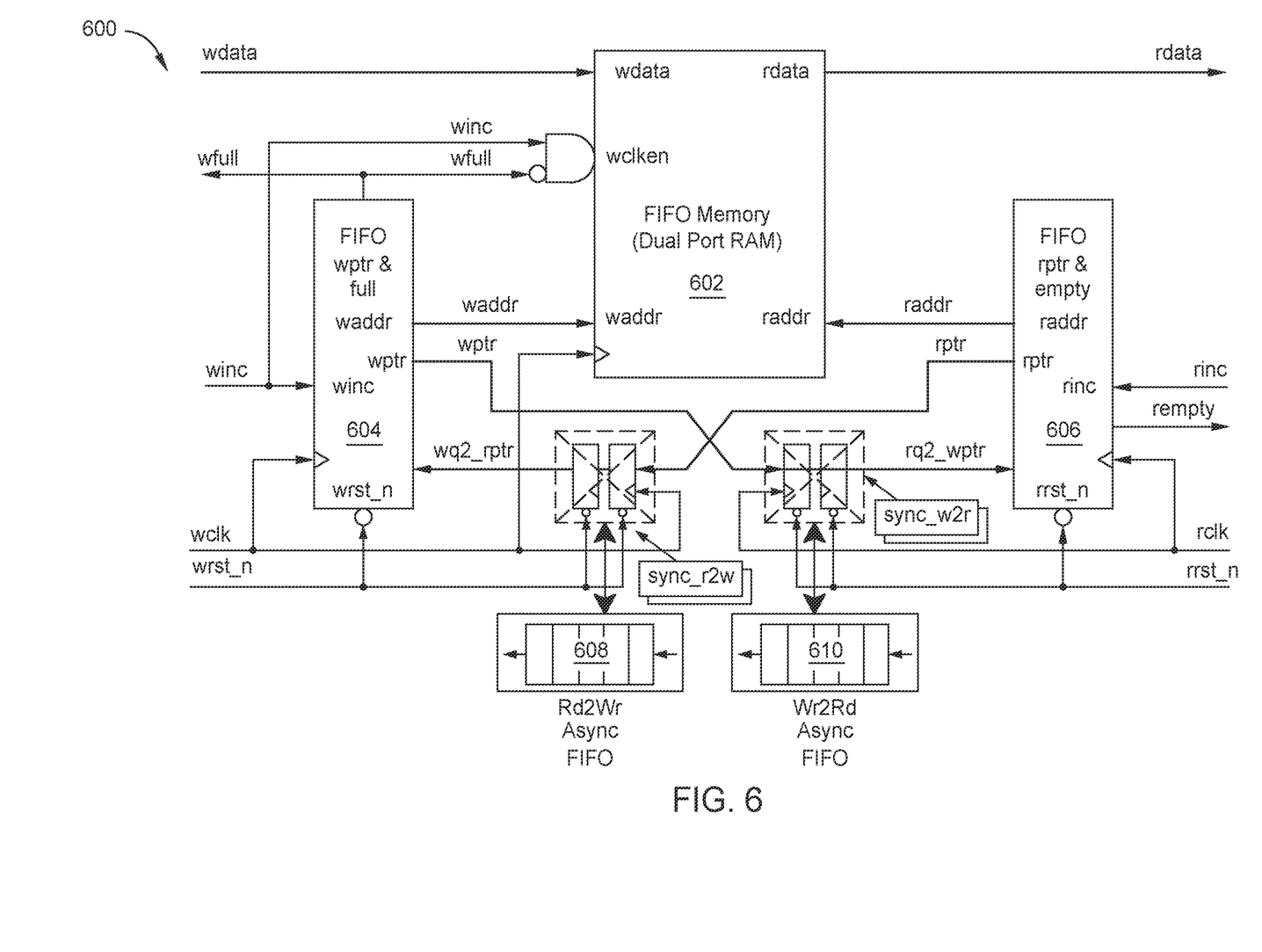
FIG. 6 is a schematic illustration of the logic for an asynchronous FIFO based sub-FIFO approach, according to disclosed embodiments.

FIG. 6 is a schematic illustration of the logic 600 for an asynchronous FIFO based sub-FIFO approach, according to disclosed embodiments. A controller, such as the controller 308 of FIG. 3, may include the logic 600. The controller includes a main FIFO chip 602, a write FIFO chip 604 coupled to the main FIFO chip 602, a read FIFO chip 606 coupled to the main FIFO chip 602, a write sub-FIFO array 608 coupled to both the write FIFO chip 604 and the read FIFO chip 606, and a read sub-FIFO array 610 coupled to both the write FIFO chip 604 and the read FIFO chip 606.

In some embodiments, the main FIFO chip 602 is a dual port random access memory (RAM). The write sub-FIFO array 608 and the read sub-FIFO array 610 each includes a plurality of sub-FIFO chips, where the number of sub-FIFO chips of the write sub-FIFO array 608 is equal to the number of sub-FIFO chips of the read sub-FIFO array 610.

The main FIFO chip may be configured to calculate the minimum index value and the maximum index value described in FIG. 4 in order to perform the logic 600 for an asynchronous FIFO based sub-FIFO approach. When a write data signal (wdata) is received by the main FIFO chip 602, the write FIFO chip 604 sends a write address (waddr) to the main FIFO chip 602 and concurrently sends a write pointer (wptr) to the read sub-FIFO array 610. Likewise, when a read data signal (rdata) is received by the main FIFO chip 602, the read FIFO chip 604 sends a read address (raddr) to the main FIFO chip 602 and concurrently sends a read pointer (rptr) to the write sub-FIFO array 608. Furthermore, the main FIFO chip 602 may be configured to receive a write clock enable signal (wclken).

When the read sub-FIFO array 610 receives the write pointer (wptr), the read sub-FIFO array 610 generates and sends a write double clock read pointer (wq2_rptr) to the write FIFO chip 604. Likewise, when the write sub-FIFO array 608 receives the read pointer (rptr), the write sub-FIFO array 608 generates and sends a read double clock write pointer (rq2_wptr) to the read FIFO chip 606. The operation of sending a write double clock read pointer (wq2_rptr) and a read double clock write pointer (rq2_wptr) to the opposing read FIFO chip 606 or the write FIFO chip 604 allows for the data synchronization from the write side to the read side and vice-versa. The read sub-FIFO array 610 and the write sub-FIFO array 608 may be configured to increment an index counter by values of one, such that the gray encoding schema requirements are satisfied and that multi-entries of data at the same clock time may be pushed or popped concurrently.

The write sub-FIFO array 608 and the write FIFO chip 604 may receive a write clock signal (wclk). Likewise, the read sub-FIFO array 610 and the read FIFO chip 606 may receive a read clock signal (rclk). Furthermore, the write FIFO chip 604 and the write sub-FIFO array 608 may be configured to receive a negative write to read signal (wrst_n) and the read FIFO chip 606 and the read sub-FIFO array 608 may be configured to receive a negative read to write signal (rrst_n).

Figure 7:
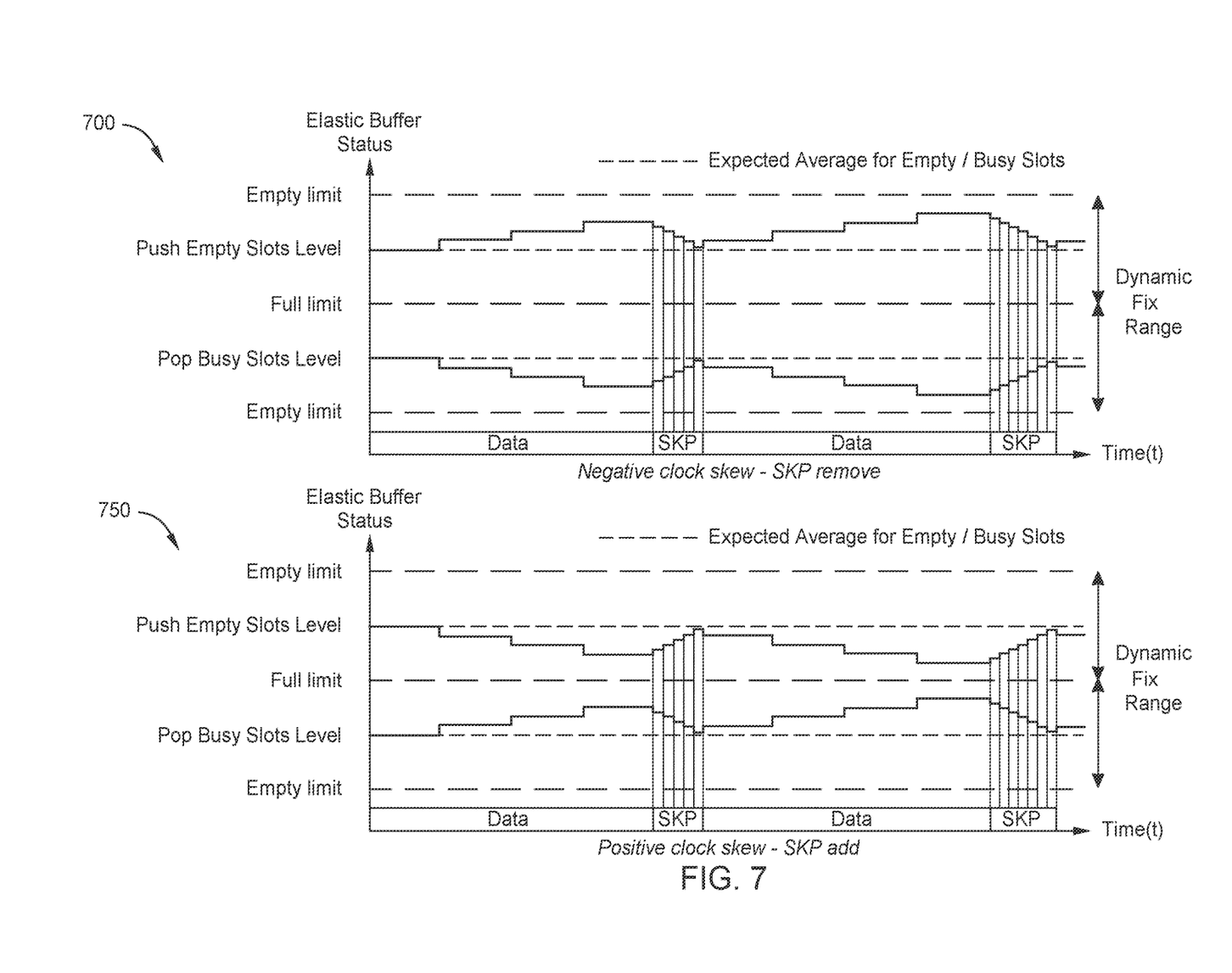
FIG. 7 is schematic illustration of an elastic buffer behavior based on a FIFO with sub-FIFO synchronization for pop operations and push operations, according to disclosed embodiments.

FIG. 7 is schematic illustration of an elastic buffer behavior based on a FIFO with sub-FIFO synchronization for pop operations 700 and push operations 750, according to disclosed embodiments. The pop operations 700 illustrates the change in the push empty slots when the pop busy slots changes. Likewise, the push operations 750 illustrates the change in the pop busy slots as the push empty slots changes.

Initially, the elastic buffer is empty (i.e., the push empty slots level and the pop busy slots level is between the empty limit and the full limit). Moving away from the middle memory value (i.e., the expected average value) indicates pop and/or push operations. The elastic buffer absorbs delays such that the value of the push empty level and the pop busy level does not reach the empty or full boundaries. SKP symbols may be added or removed in order to remain in the dynamic range available for delay fixing. For example, in the pop operations 700, as the pop busy slots level becomes increasingly empty, the push empty slots level becomes increasingly empty. Likewise, in the push operations 750, as the pop busy slots level become increasingly full, the push empty slots level becomes increasingly full.

After a certain amount of operations or a certain amount of time, the controller and/or processors are configured to add/remove SKP symbols to return the push empty slots level and the pop busy slots level to the expected average for empty/busy slots level. The SKP symbols may be removed or added in any number due to the logic 600 and the asynchronous asymmetrical FIFO based approach described in FIG. 4, such that the delay may be dynamically adjusted.

By utilizing an asynchronous asymmetrical FIFO based approach, memory depth optimization of an elastic buffer is possible. Additionally, the change of data corruption while passing between independent clock domains in the elastic buffer is minimized. Finally, the data path latency is decreased through PHY due to not using a hand shake FIFO and/or FIFO chaining, which increases throughput performance due to pipeline characteristics.

In one embodiment, a data storage device comprises: one or more memory devices; and a controller coupled to the one or more memory devices, wherein the controller is configured to deliver data to a host device according to an asynchronous asymmetric First In, First Out (FIFO) process. The asynchronous asymmetric FIFO process comprises calculating a minimum index value and a maximum index value. The minimum index value is calculated according to the following formula: ((required depth rounded to the power of 2)/2)−((required depth)/2) where the required depth is a number of index entries times two to account for full and empty status, and where rounded to the power of 2 is an even number of a geometric sequence starting at 2 with a common ratio of 2. The maximum index value is calculated according to the following formula: ((required depth rounded to the power of 2)/2)+((required depth)/2)−1.

In another embodiment, a data storage device comprises: one or more memory devices; and a controller coupled to the one or more memory devices, wherein the controller comprises: a main First In, First Out (FIFO) chip; a write FIFO chip coupled to the main FIFO chip; a read FIFO chip coupled to the main FIFO chip; a write sub-FIFO chip array, wherein the write sub-FIFO chip array is coupled to the write FIFO chip and the read FIFO chip; and a read sub-FIFO chip array, wherein the read sub-FIFO chip array is coupled to the write FIFO chip and the read FIFO chip. The write sub-FIFO chip array contains a first plurality of sub-FIFO chips, wherein the read sub-FIFO chip array contains a second plurality of sub-FIFO chips, and wherein the first plurality is equal to the second plurality. The read FIFO chip is configured to send a read address to the main FIFO chip, wherein the read FIFO chip is configured to send a read pointer to the write sub-FIFO chip array. The write sub-FIFO chip array is configured to deliver a write double clock read pointer to the write FIFO chip. The write FIFO chip is configured to send a write address to the main FIFO chip, wherein the write FIFO chip is configured to send a write pointer to the read sub-FIFO chip array. The read sub-FIFO chip array is configured to deliver a read double clock write pointer to the read FIFO chip. The write sub-FIFO chip array is configured to receive a write clock signal and a write to read is negative signal. The read sub-FIFO chip array is configured to receive a read clock signal and a read to write is negative signal. The write FIFO chip is configured to receive the write clock signal and wherein the read FIFO chip is configured to receive the read clock signal. The write FIFO chip is configured to receive the write to read is negative signal and wherein the read FIFO chip is configured to receive the read to write is negative signal. The main FIFO chip is configured to receive a write clock enable signal. The main FIFO chip is configured to receive a write data signal and wherein the main FIFO chip is configured to send a read data signal. The main FIFO chip is a dual port random access memory (RAM).

In another embodiment, a data storage device comprises: means to store data; and a controller coupled to the means to store data, wherein the controller is configured to: calculate a minimum index value; calculate a maximum index value; and synchronize indexes of read pointers and write pointers based upon the calculated minimum index value and the maximum index value. The data storage device further comprises means to receive a write pointer signal, a read clock signal, and a read to write is negative signal. The data storage device further comprises means to receive a read pointer signal, a write clock signal, and a write to read is negative signal.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
one or more memory devices; and
a controller coupled to the one or more memory devices, wherein:
the controller is configured to deliver data to a host device according to an asynchronous asymmetric First In, First Out (FIFO) process;
the asynchronous asymmetric FIFO process comprises calculating a minimum index value and a maximum index value; and
the minimum index value is a lower bound of a memory depth range and the maximum index value is an upper bound of the memory depth range.

2. A data storage device, comprising:
one or more memory devices; and
a controller coupled to the one or more memory devices, wherein the controller is configured to deliver data to a host device according to an asynchronous asymmetric First In, First Out (FIFO) process, wherein:
the asynchronous asymmetric FIFO process comprises calculating a minimum index value and a maximum index value; and
the minimum index value is calculated according to the following formula:

((required depth rounded to the power of 2)/2)−((required depth)/2)

wherein the required depth is a number of index entries times two to account for full and empty status, and where rounded to the power of 2 is an even number of a geometric sequence starting at 2 with a common ratio of 2.

3. The data storage device of claim 2, wherein the maximum index value is calculated according to the following formula:

((required depth rounded to the power of 2)/2)+((required depth)/2)−1.

4. A data storage device, comprising:
one or more memory devices; and
a controller coupled to the one or more memory devices, wherein the controller comprises:
a main First In, First Out (FIFO) chip;
a write FIFO chip coupled to the main FIFO chip;
a read FIFO chip coupled to the main FIFO chip;

a write sub-FIFO chip array, wherein the write sub-FIFO chip array is coupled to the write FIFO chip and the read FIFO chip; and a read sub-FIFO chip array, wherein the read sub-FIFO chip array is coupled to the write FIFO chip and the read FIFO chip; wherein:

the write FIFO chip is capable of sending signals to the main FIFO chip and the read sub-FIFO chip array concurrently;

the read FIFO chip is capable of sending signals to the main FIFO chip and the write sub-FIFO chip array concurrently;

the read FIFO chip is configured to send a read address to the main FIFO chip;

the read FIFO chip is configured to send a read pointer to the write sub-FIFO chip array; and the write sub-FIFO chip array is configured to deliver a write double clock read pointer to the write FIFO chip.

5. The data storage device of claim 4, wherein the write sub-FIFO chip array contains a first plurality of sub-FIFO chips, wherein the read sub-FIFO chip array contains a second plurality of sub-FIFO chips, and wherein the first plurality is equal to the second plurality.

6. The data storage device of claim 4, wherein the write FIFO chip is configured to send a write address to the main FIFO chip, wherein the write FIFO chip is configured to send a write pointer to the read sub-FIFO chip array.

7. The data storage device of claim 6, wherein the read sub-FIFO chip array is configured to deliver a read double clock write pointer to the read FIFO chip.

8. The data storage device of claim 4, wherein the write sub-FIFO chip array is configured to receive a write clock signal and a negative write to read signal.

9. The data storage device of claim 8, wherein the read sub-FIFO chip array is configured to receive a read clock signal and a negative read to write signal.

10. The data storage device of claim 9, wherein the write FIFO chip is configured to receive the write clock signal and wherein the read FIFO chip is configured to receive the read clock signal.

11. The data storage device of claim 10, wherein the write FIFO chip is configured to receive the negative write to read signal and wherein the read FIFO chip is configured to receive the negative read to write signal.

12. The data storage device of claim 4, wherein the main FIFO chip is configured to receive a write clock enable signal.

13. The data storage device of claim 12, wherein the main FIFO chip is configured to receive a write data signal and wherein the main FIFO chip is configured to send a read data signal.

14. The data storage device of claim 4, wherein the main FIFO chip is a dual port random access memory (RAM).

* * * * *